United States Patent [19]

Damone

[11] 4,073,499
[45] Feb. 14, 1978

[54] STROLLER FOR A CHILD

[75] Inventor: Frank Damone, 166 Porter St., Stratford, Conn. 06947

[73] Assignee: Frank Damone, Stratford, Conn.

[21] Appl. No.: 697,392

[22] Filed: June 18, 1976

[51] Int. Cl.² .............................................. B62B 7/00
[52] U.S. Cl. ................................................ 280/1.1 R
[58] Field of Search ............... 280/1.1 R, 1.1 A, 1.22, 280/47.38, 47.34, 47.37, 47.4; 272/52; 46/106, 107, 108, 116; D12/129

[56] References Cited

U.S. PATENT DOCUMENTS

| D. 146,932 | 6/1947 | Wenpetren | D12/129 |
|---|---|---|---|
| 2,570,834 | 10/1951 | Meth | 280/1.22 X |
| 2,685,325 | 8/1954 | Webster | D12/129 |
| 3,702,016 | 11/1972 | Keesee | 280/47.37 R |

Primary Examiner—Joseph F. Peters, Jr.
Assistant Examiner—R. Schrecengost
Attorney, Agent, or Firm—Robert J. Eichelburg

[57] ABSTRACT

A stroller comprising an animal figurine mounted on wheels is disclosed, a saddle seat being provided on the back of the figurine on which a child may be seated. A back rest extends from the animal figurine upwardly in back of the saddle seat to support at least part of the back of a child seated on the saddle, a handle being provided as an extension of the back rest for grasping by a person walking behind the stroller and for pushing the stroller.

2 Claims, 2 Drawing Figures

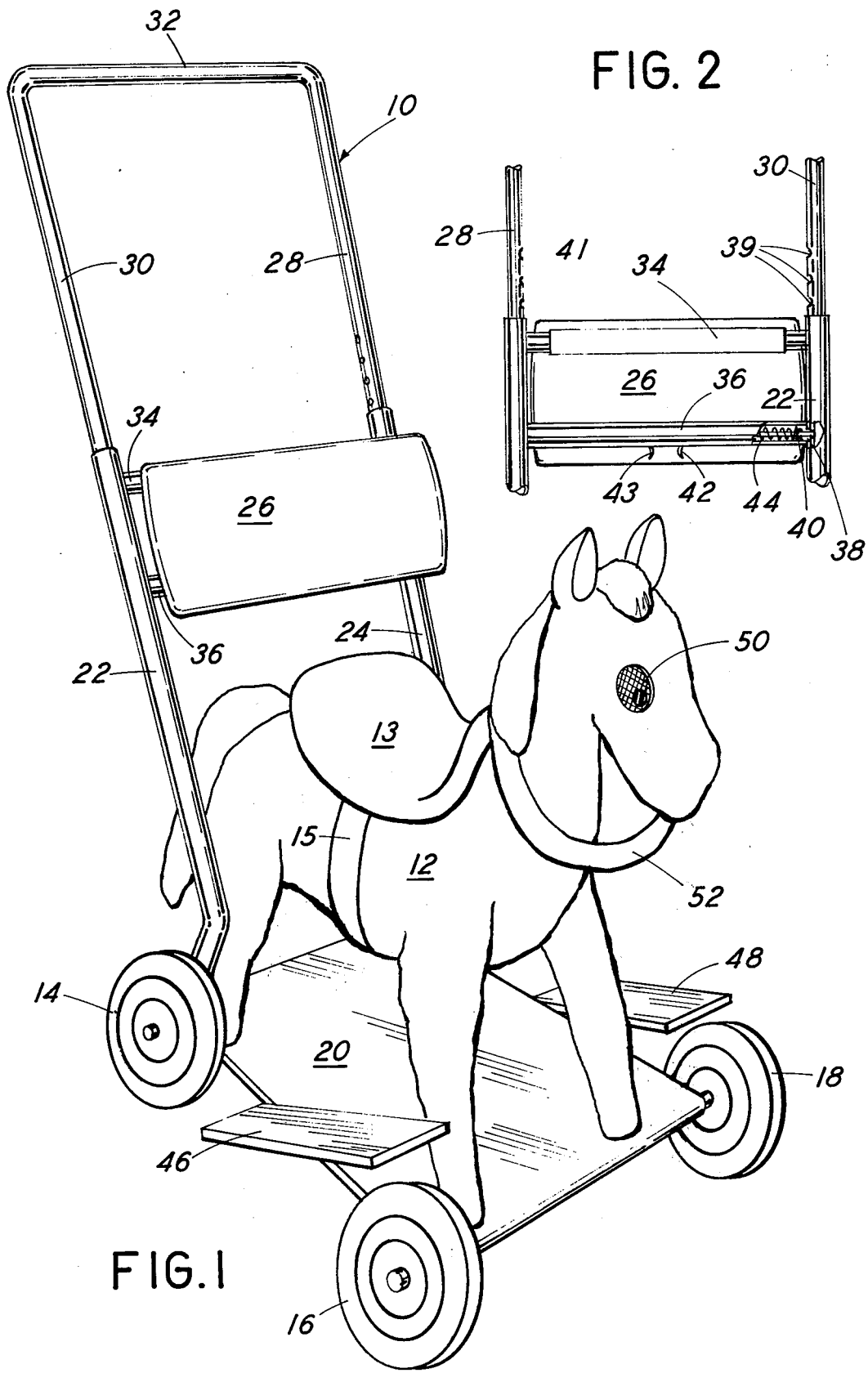

STROLLER FOR A CHILD

SUMMARY OF THE INVENTION

The present invention relates to a stroller for a child comprising an animal figurine mounted on wheels for rolling the animal figurine over a surface. A saddle shaped seat is positioned on the back of the animal figurine for supporting a child thereon in a seated position astride the back of the animal figurine. A back support is positioned upwardly from the animal figurine for providing back support for a child sitting on the saddle shaped seat, a handle extending upwardly from the back support also being provided for grasping by a person walking behind the stroller for pushing the stroller.

In another embodiment, the wheels comprise a wheeled platform, the animal figurine being mounted on the platform. The back support may be secured either to the figurine or the platform.

The back support may comprise a pair of parallel rails extending upwardly on either side of the animal figurine in back of the saddle shaped seat, the back rest extending between and being secured to the parallel rails above the back of the saddle seat and for receiving at least a portion of the back of a child sitting on the saddle shaped seat.

The handle may comprise an adjustable handle which is retractably extendable from and towards the parallel rails.

In one embodiment, the parallel rails comprise a first pair of parallel tube members having a catch member thereon for releasably securing the handle in any of a plurality of extended positions, the handle comprising a second pair of parallel tubes telescopically engaging the first pair of tubes and releasably securable thereto through the catch member. A transverse bar spans the second pair of parallel tubes at the uppermost extremity thereof for rigidly separating the second pair of parallel tubes and for grasping by a person walking behind the stroller and for pushing the stroller.

The catch member comprises a tube transversely positioned between the first pair of parallel tubes in openings in the first pair of parallel tubes in combination with a transversely displaceable shaft member in said tube for operatively engaging the second pair of parallel tubes through the openings in the first pair of parallel tubes. A resilient member such as a spring is positioned in the tube for operatively engaging and resiliently biasing the shaft through at least one of said openings into spaced shaft receiving openings in the second pair of parallel tubes for receiving the shaft. A second handle extends from the shaft for manually sliding the shaft out of the openings. The back rest is mounted on the tube transversely positioned between the first pair of parallel tubes according to another embodiment of the present invention.

The stroller in another embodiment has foot receiving members for resting the feet, the foot receiving members being mounted beneath the saddle seat and especially on the platform and beneath the saddle seat and forward of the front of the saddle shaped seat

BRIEF DESCRIPTION OF THE DRAWING

FIG. 1 comprises a perspective view illustrating a stroller for a child comprising an animal figurine and specifically a toy horse mounted on wheels, the horse figurine having a saddle on the back thereof and a back support extending upwardly from the figurine for providing back support for a child sitting on the figurine, the handle extending upwardly from the back support for grasping by a person walking behind the stroller for pushing the stroller according to one embodiment of the present invention;

FIG. 2 comprises a plan view in section illustrating an adjustable handle for use in conjunction with a stroller comprising an animal figurine on wheels according to another embodiment of the present invention.

DETAILED DESCRIPTION OF THE PREFERRED EMBODIMENT

Wheeled animal figure toys are disclosed in the prior art U.S. Pat. Nos. 3,298,702 Rademacher; 3,161,417 Goldfarb; 2,725,237 Feist; 2,604,330 Creasey; 2,570,834 Meth; 1,814,230 Sperry; 1,646,606 Wilson; and, 1,344,548 Marsden.

It is an object of the present invention to provide a novel wheeled animal figure toy that can be ridden by a person especially a child which provides a greater degree of comfort for the person riding the wheeled animal figure that heretofore described in the prior art.

It is a further object of the present invention to provide a novel wheeled animal figure toy which may be pushed as a stroller.

These and other objects have been achieved according to the present invention and will become apparent from the disclosure and claims that follow as well as the appended drawing.

Referring to the drawing, a novel stroller 10 for a child is illustrated comprising an animal figurine 12 mounted on a wheeled platform 20 having wheels 14, 16 and 18 attached to the corners thereof, a fourth wheel not illustrated also being provided in the right rear corner of the platform 20. A saddle shaped seat 13 is secured to the back of the animal figurine 12 by means of a strap 15, the saddle shaped seat being provided for supporting a child thereon in a seated position astride the back of the figurine 12. A back support 26 extends upwardly from the animal figurine 12 and is supported by a pair of parallel tubes 22 and 24 having transverse securing bars 34 and 36 secured thereto on which said transverse supporting bars seat back 26 is mounted. Seat back 26 extends in the area in back of the saddle seat 13 and supports at least a portion of the back of a child sitting in saddle seat 13, a full sized back piece 26 for extending the full length and breadth of the back of a child sitting on saddle seat 13 also being securable to cross bars 34 and 36 as an alternate embodiment of the back rest 26. Back rest 26 in one embodiment comprises a padded back rest. A handle comprising a second set of parallel tubes 28 and 30 telescopically fitting inside of the first pair of parallel tubes 22 and 24 is provided, the handle comprising the second pair of parallel tubes 28 and 30 being joined at the uppermost extremity thereof by a cross piece 32 which may be grasped by a person walking behind the stroller 10 and for pushing the stroller 10. The handle comprising parallel tubes 28 and 30 and cross bar 32 comprises an adjustable handle retractably extendable from and towards the first parallel tubes 22 and 24 which have a catch assembly thereon for releasably securing the handle in any of a plurality of extended positions. The catch apparatus comprises the tube 36 transversely positioned between the parallel tubes 22 and 24 in openings in parallel tubes 22 and 24 such as opening 38 in tube 22 in combination with a transversely displaceable shaft 40 in tube 36 for operatively engaging at least one of said second pair of parallel tubes 28 and 30 through an opening such as opening 38 in first parallel tubes 22 and 24. The shaft 40 is resiliently biased through opening 38 into any one of a plurality of openings 39 in tube 30 and similarly an arrangement of a shaft in tube 36 may be provided for resiliently engaging the openings 41 in tube 28. A resilient member such as coil spring 44 is provided for operatively engaging and resiliently biasing the shaft 40 through opening 38, a similar resilient member being provided for biasing a shaft in tube 36 into the openings 41 of tube 28. A handle 42 is provided on shaft 40 for manually disengaging the shaft 40 from any of the openings 39, handle 42 riding in a slot (not illustrated) on the bottom of tube 36. Similarly a handle 43 is provided for operating a similar shaft in tube 36 for disengagement of said shaft from the openings 41 in tube 28. A pair of foot rests 46 and 48 are positioned beneath the saddle seat and forward of the front of said saddle seat for aiding a child in mounting and dismounting the figurine as well as for providing for the comfort of a child sitting astride the figurine 12 on saddle seat 13. Reflecting eyes 50 are provided as a safety feature for use of the figurine at night and a rein 52 is provided as a play item for amusing the child while being wheeled on the stroller 10.

Although the invention has been described by reference to some embodiments, it is not intended that the novel stroller be limited thereby but that modification thereof are intended to be included as falling within the broad scope and spirit of the foregoing disclosure the following claims and the appended drawing.

I claim:

1. A stroller for a child comprising an animal figurine mounted on wheel means for rolling said animal figurine over a surface, a saddle shaped seat positioned on the back of said animal figurine for supporting a child thereon in a seated position astride the back of said animal figurine, back support means comprising parallel rails and a back rest positioned upwardly from said animal figurine for providing back support for a child sitting on said saddle shaped seat, handle means extending upwardly from said back support means for grasping by a person walking behind said stroller and for pushing said stroller; said handle means comprising an adjustable handle retractably extendible from and towards said parallel rails; said parallel rails comprising a first pair of parallel tube members having catch means thereon for releasably securing said handle means in any of a plurality of extended positions, said handle means comprising a second pair of parallel tubes telescopically engaging said first pair of parallel tubes, and releasably securable thereto by said catch means, transverse bar means spanning said second pair of parallel tubes at the uppermost extremity thereof for rigidly separating said second pair of parallel tubes and for grasping by a person walking behind said stroller and for pushing said stroller, said catch means comprises a tube transversely positioned between said first pair of parallel tubes in openings in said first pair of parallel tubes, transversely displacable shaft means in said tube, for operatively engaging said second pair of parallel tubes through said openings in said first pair of parallel tubes, resilient means in said tube for operatively engaging and resiliently biasing said shaft means through at least one of said openings in said first pair of parallel tubes, spaced shaft receiving openings in said second pair of parallel tubes for receiving said shaft means, second handle means extending from said shaft for manually moving said shaft out of said openings in said second pair of parallel tubes.

2. The stroller of claim 1 where said back rest is mounted on said tube transversely positioned between said first pair of parallel tubes.

* * * * *